United States Patent [19]

Fox

[11] 4,336,213
[45] Jun. 22, 1982

[54] PLASTIC EXTRUSION APPARATUS AND METHOD

[76] Inventor: Steve A. Fox, Rte. 1, Box 745-B, Taylorsville, N.C. 28681

[21] Appl. No.: 118,897

[22] Filed: Feb. 6, 1980

[51] Int. Cl.³ .......................... B29F 3/06; F04C 25/00
[52] U.S. Cl. ..................... 264/40.1; 222/56; 222/63; 264/40.4; 264/40.7; 264/176 R; 418/102; 418/191; 425/376 B
[58] Field of Search ............... 277/134; 418/102, 191; 425/376 R, 376 B; 264/176 R, 40.7, 176 F, 40.4, 40.1; 222/56, 63; 73/232, 261

[56] References Cited

U.S. PATENT DOCUMENTS

| | | | |
|---|---|---|---|
| 1,448,079 | 3/1923 | Noeggerath | 277/134 |
| 1,448,080 | 3/1923 | Noeggerath | 277/134 |
| 1,682,842 | 9/1928 | Hamer | 418/102 |
| 1,709,580 | 4/1929 | Jensen | 277/134 |
| 1,733,416 | 10/1929 | Lebesneros | 277/134 |
| 1,770,496 | 7/1930 | Lawaczeck | 277/134 |
| 2,038,299 | 4/1936 | Kohlhagen | 277/134 |
| 2,487,177 | 11/1949 | Pollock | 277/134 |
| 3,131,940 | 5/1964 | Ertaud | 277/134 |
| 3,131,942 | 5/1964 | Ertaud | 277/134 |
| 3,331,101 | 7/1967 | Thomas | 277/134 |
| 3,368,799 | 2/1968 | Sluijters | 418/102 |
| 3,700,247 | 10/1972 | Butler et al. | 277/134 |
| 3,762,313 | 10/1973 | Schott | 425/378 |
| 3,973,779 | 8/1976 | Burgmann et al. | 277/134 |
| 3,975,026 | 8/1976 | Boyle et al. | 277/135 |
| 4,010,960 | 3/1977 | Martin | 277/134 |
| 4,171,193 | 10/1979 | Rahlfs | 264/40.7 |

FOREIGN PATENT DOCUMENTS

| | | | |
|---|---|---|---|
| 2700003 | 7/1978 | Fed. Rep. of Germany | 425/145 |
| 1348765 | 12/1963 | France . | |
| 322778 | 12/1929 | United Kingdom | 418/102 |

Primary Examiner—Willard E. Hoag
Attorney, Agent, or Firm—Bell, Seltzer, Park & Gibson

[57] ABSTRACT

A plastic extrusion apparatus is provided which includes a gear pump for accurately metering the plastic through a die. The apparatus is adapted to process highly viscous plastic material under high temperature and pressure conditions, and the gear pump includes a non-leaking and substantially frictionless seal for the drive shaft. The seal comprises a sleeve surrounding the shaft, and a shallow helical channel formed in the bore of the sleeve, with the helical channel being of a hand such that forward rotation of the shaft results in the plastic which enters the clearance between the shaft and sleeve to be effectively pumped back toward the interior of the housing.

8 Claims, 7 Drawing Figures

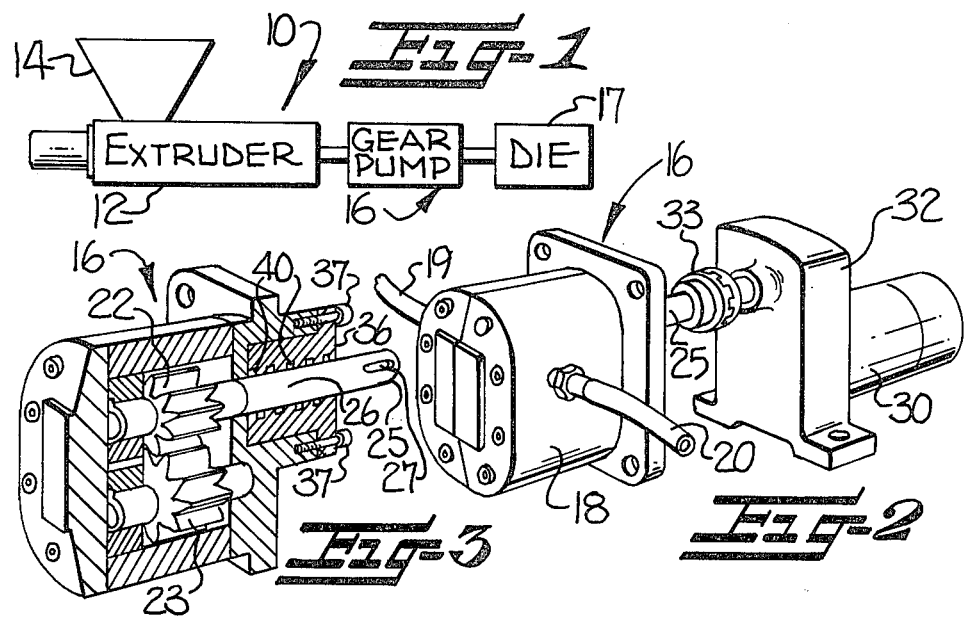
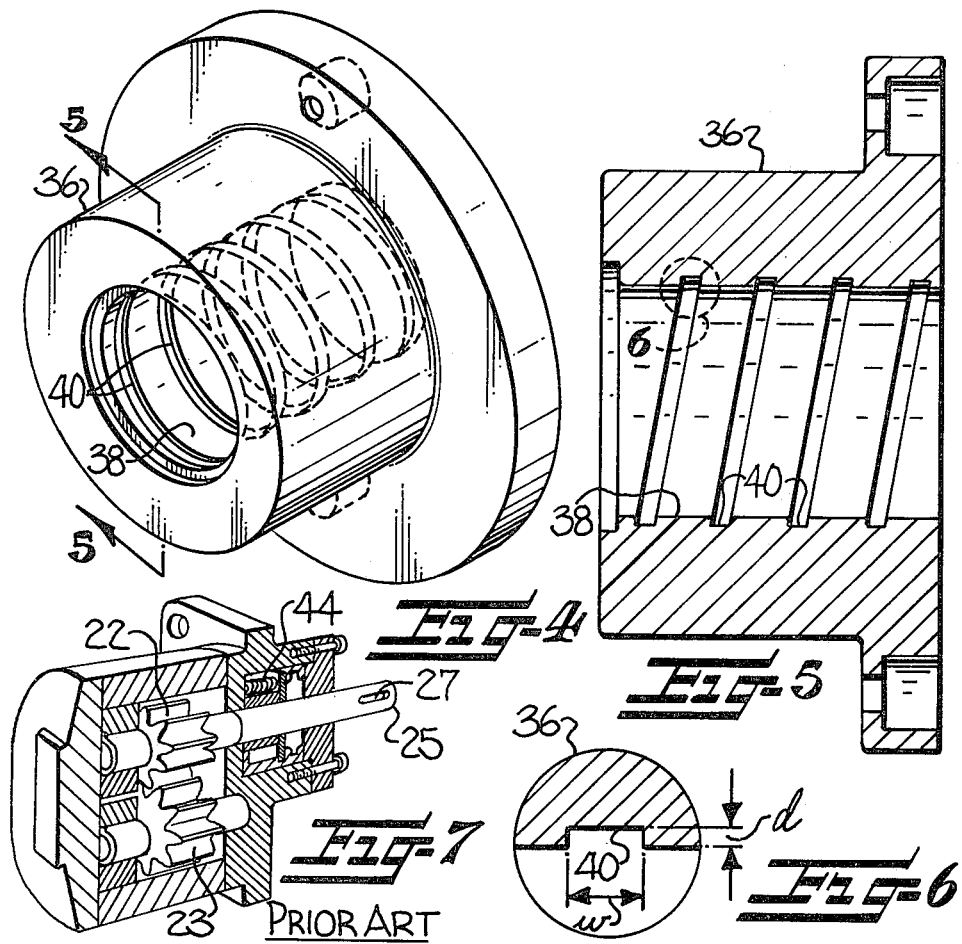

PLASTIC EXTRUSION APPARATUS AND METHOD

The present invention relates to an apparatus and method for extruding a metered quantity of melted plastic material or the like, and which is characterized by the ability to extrude a highly viscous plastic material under high pressure and temperature conditions, and without substantial leakage of the material.

Conventional plastic extruders comprise an elongate, heated barrel having a rotatable auger disposed therein. The pellets or granules of the plastic are delivered into one end of the extruder barrel, and the plastic is heated and melted as it is forced along the length of the barrel by the rotation of the auger. The discharge end of the barrel usually mounts a suitable die, and such that the extruded plastic may be formed into a desired cross-sectional configuration as it leaves the barrel.

Such prior extruding machines are in widespread use. However, difficulties are encountered where it is desired to extrude a product of very accurate cross-sectional configuration, since the output pressure of the extruder inherently varies. Thus the pressure of the plastic passing through the die varies, and this in turn results in the extruded product having varying dimensions along its length. As an example, in extruding plastic film, it is common for the thickness to vary from between 6 to 10%, and as a result, additional material must be extruded to insure that the minimum thickness tolerance is maintained. This results in the film being more thick than necessary in most of its area, and a significant amount of the plastic is thus wasted.

In certain extruding operations, it has been proposed to position a gear pump downstream of the extruder to more accurately meter the plastic through a die, or downstream of a plastic reactor to increase its pressure so as to force the material through a die. For example, in nylon spinning operations, it has been proposed to mount a gear pump downstream of the extruder or plastic reactor to meter the nylon through the spinerette. While the use of a gear pump is satisfactory for these particular applications, in instances where the plastic is delivered to the pump under relatively high pressure, for example above between about 600 to 1,000 psi, leakage of the plastic occurs through the packing or mechanical seal around the drive shaft of the gear pump, causing loss of material and a significant housekeeping problem. With certain pump designs and operating parameters, leakage may occur at pressures below 600 psi.

Packing seals of the type typically utilized with prior gear pumps usually consist of a graphite impregnated cotton material which is squeezed against the shaft. Thus the packing material is in frictional contact with the shaft, which causes wear and deterioration of the packing material and necessitates its frequent replacement. This frictional contact can cause the shaft itself to be worn, and it increases the power requirement of the gear pump. Also, the high pressure encountered in the gear pump when it is attached downstream of an extruder as described above can effectively destroy the shaft sealing material of the pump after a short period of use.

It is accordingly an object of the present invention to provide an extruding apparatus and method adapted to extrude a highly viscous plastic material under high pressure and temperature conditions, and which is characterized by the substantial absence of leakage of the plastic material.

It is a more particular object of the present invention to provide a gear pump adapted for accurately metering a highly viscous material under relatively high pressure and temperature conditions, and which includes a seal for the drive shaft which effectively precludes leakage of the material therethrough.

It is also a specific object of the present invention to provide a seal for a gear pump of the described type which is substantially frictionless and nonwearing, which is of a simple construction, and which is able to withstand operating pressures above about 600 psi.

These and other objects and advantages of the present invention are achieved in the embodiment illustrated herein by the provision of a plastic extrusion apparatus which comprises an extruder adapted for heating and melting a highly viscous plastic under relatively high pressure and temperature conditions, a die adapted for receiving hot melted plastic and forming the same into a desired cross-sectional configuration, and a gear pump operatively mounted between the discharge port of the extruder and the die for accurately metering the plastic through the die. In accordance with the present invention, the gear pump comprises an enclosed housing having inlet port means and discharge port means, gear means rotatably mounted within the housing to convey the plastic from the inlet port means to the discharge port means, and a shaft extending through the housing and operatively connected to the gear means for transmitting rotational torque to the same. The gear pump also includes means for sealing the shaft to the housing which comprises a sleeve fixed to the housing and having an internal cylindrical bore closely surrounding the cylindrical surface of the shaft, with the cylindrical bore having a shallow helical channel formed therein, with the channel being of a hand such that forward rotation of the shaft and gear means results in the plastic which enters the clearance between the shaft cylindrical surface and the cylindrical bore to be effectively pumped back toward the interior of the housing. The channel is preferably of generally rectangular cross-sectional configuration and has a depth not greater than that determined from a particular mathematical formula as hereinafter set forth.

Some of the objects having been stated, other objects will appear as the description proceeds, when taken in connection with the accompanying drawings in which:

FIG. 1 is a schematic illustration of a plastic extrusion apparatus in accordance with the present invention;

FIG. 2 is a perspective view of the gear pump of the extrusion apparatus;

FIG. 3 is a vertical sectional view of a gear pump embodying the features of the present invention, FIG. 4 is a perspective view of the sleeve portion of the seal illustrated in FIG. 3;

FIG. 5 is a vertical sectional view of the sleeve taken substantially along the line 5—5 of FIG. 4;

FIG. 6 is an enlarged fragmentary view of the channel in the bore of the sleeve and indicated by the circle 6 in FIG. 5, and FIG. 7 is a view similar to FIG. 3 but illustrating a conventional packing shaft seal of the prior art.

Referring more specifically to the drawings, FIG. 1 is a schematic illustration of a plastic extrusion apparatus embodying the features of the present invention. The apparatus includes a conventional plastic extruder 10 which includes a barrel 12 which is adapted to receive pellets or granules of the plastic at one end thereof from a hopper 14. The barrel 12 is typically heated by steam or electrical coils, and includes a central auger (not shown) which is rotated to convey the heated and melted plastic through a discharge port at the opposite end. In accordance with the present invention, the extruder is adapted to heat and melt a highly viscous plastic material under relatively high conditions of temperature and pressure. For example, the plastic will typically have a viscosity of between about 500,000 to 10,000,000 centipoise at the operating temperature of between about 250 to 450 degrees F. The pressure in the extruder will typically reach 600 to 4,000 psi. A gear pump 16 is mounted to receive the pressurized melted plastic from the discharge port of the extruder, and a die 17 is mounted downstream of the gear pump for forming the plastic into a desired cross-sectional configuration.

The gear pump 16 comprises a housing 18 having inlet port means 19 for receiving the melted plastic from the discharge port of the extruder, and discharge port means 20 for discharging the plastic to the die. A pair of meshing gears 22, 23 are rotatably mounted within the housing and are adapted upon forward rotation to convey the plastic from the inlet port means 19 to the discharge port means 20. A shaft 25 extends through the housing and is operatively connected to the gears for transmitting rotational torque thereto. The shaft 25 includes a smooth and uninterrupted cylindrical outer surface portion 26, and a key 27 is mounted at the remote end for coupling the shaft to the drive motor 30, which acts through the gear reduction box 32 and flexible coupling 33 to rotate the shaft at a predetermined speed.

The gear pump further includes means for sealing the shaft to the housing to effectively preclude leakage of the melted plastic therebetween. This sealing means comprises a sleeve 36 removably secured to the housing 18 by bolts 37 or the like, and which has an internal cylindrical bore 38 which closely surrounds the cylindrical surface portion 26 of the shaft. The bore 38 further has a shallow helical channel 40 of generally rectangular cross-sectional configuration formed in substantially the entire axial length thereof. Also, the helical channel 40 is of a hand such that forward rotation of the shaft and gears 22, 23 results in the plastic which enters the clearance between the shaft cylindrical surface portion 26 and the cylindrical bore 38 to be effectively pumped back toward the interior of the housing 18.

Under the typical operating conditions of the present invention, the melted plastic has a viscosity of at least about 500,000 centipoise at its operating temperature of about 300 degrees F., and the plastic is delivered to the pump from the extruder at a pressure of between about 600 to 1,400 psi, although higher extruder pressures are sometimes employed. The pump 16 is operated to discharge the plastic through the outlet port means under a pressure of up to about 4,000 to 5,000 psi, or above. Since the entrance to the clearance between the surface portion 26 and bore 38 in the interior of the housing bridges the gap between the inlet and discharge areas of the housing in the case of many conventional pumps, it may be assumed that the seal is subjected to this discharge pressure. As explained above, the plastic which enters the clearance will be effectively pumped back toward the interior of the housing by the channel of the sealing means.

In accordance with the present invention, it has been found that several structural features of the helical channel 40 are of significance in insuring that the channel will function as a seal in the above described manner, and when processing highly viscous plastic under high temperature and pressure conditions are described above. More specifically, it has been found that the clearance between the exterior surface 26 of the shaft and the bore 38 of the sleeve should be as small as reasonable manufacturing tolerances permit, while insuring no significant frictional contact. Typically, the radial clearance is between about 0.003 to 0.004 inches. Also, it is significant that the channel 40 should be surprisingly shallow in depth. In the case of a rectangular channel as generally illustrated in FIG. 6, with a minimum shaft clearance as described above, the channel should have a depth not exceeding the square root of $$6(\pi)DNuL/P \tan Q$$

wherein D is the diameter of the shaft, N is the revolutions of the shaft per second, u is the viscosity of the plastic being processed, L is the length of the seal, P is the pressure of the plastic at the seal (usually the discharge pressure of the pump), and Q is the lead angle of the helical channel.

Applying the above formula to a specific example, a gear pump is provided wherein
 D = 0.674 inches
 N = 1 revolution per second
 u = 1,000,000 centipoise (i.e., 0.145 pound-seconds per square inch)
 L = 1.061 inches
 P = 5,000 psi
 Q = 6.7 degrees (tan Q = 0.118)

Solving for the square root of the above formula indicates that the depth of the channel should not exceed 0.0074 inches in the case of this particular seal structure. The above formula is believed to be accurate for cases where the depth d of the channel is not greater than about 0.3 times its width w (FIG. 6), which is the preferred configuration. A channel depth greater than that indicated from the formula will likely result in leakage through the channel to the outside of the seal. In actual practice, it may be preferable to design the channel depth well below the maximum indicated by the above formula in order to permit the pump to accommodate varying operating conditions without leakage. In this regard, a channel has been constructed having a depth of 0.03 inches, and a width of 0.125 inches, in a seal having the other structural characteristics as set forth in the above specific example, with very satisfactory results.

The materials of the various components of the pump are conventional, and the shaft 25 and sleeve 36 are typically fabricated from stainless steel.

FIG. 7 illustrates a conventional gear pump of the general type utilized with the present invention, and which incorporates a conventional packing seal 44. As noted above, this type of seal tends to leak under the conditions of use contemplated with the present invention, and in addition, the packing material is in frictional contact with the shaft, causing wear and deterioration of the packing material as well as the shaft. The seal of the present invention not only avoids the leakage problem as noted above, but there is no significant frictional contact between the components of the seal, so that the above problems associated with wear in the conventional packing seal are effectively alleviated.

In the drawings and specification, there has been set forth a preferred embodiment of the invention, and although specific terms are employed, they are used in a generic and descriptive sense only and not for purposes of limitation. In addition, while the gear pump of the invention has been described in association with a plastic extrusion apparatus, it will be understood that the gear pump may be used to meter or pump a variety of non-plastic, viscous materials.

That which is claimed is:

1. In a method including extruding a melted plastic material and wherein the plastic is metered by passing through a gear pump, the improvement comprising:

passing said plastic material through a gear pump having (a) an enclosed housing having inlet port means for receiving the melted plastic, and discharge port means for discharging the plastic therefrom,
   (b) gear means rotatably mounted within said housing and adapted upon forward rotation to convey the plastic from said inlet port means to said discharge port means,
   (c) a shaft extending through said housing and operatively connected to said gear means for transmitting rotational torque to the same, said shaft including a cylindrical outer surface portion, and
   (d) means for sealing said shaft to said housing to effectively preclude leakage of the melted plastic therebetween, said sealing means comprising a sleeve removably secured to said housing and having an internal cylindrical bore closely surrounding said cylindrical surface portion of said shaft, with said cylindrical bore having a shallow helical channel formed therein and extending along at least a substantial portion of the axial length thereof, said channel being of generally rectangular cross-sectional configuration and having a depth not exceeding the square root of $6(\text{pi})DNuL/P \tan Q$ wherein D is the diameter of said shaft, N is the rotational speed of the shaft in revolutions per second, u is the viscosity of the plastic, L is the length of the seal, P is the pressure of the plastic, and Q is the lead angle of the helical channel, with such variables being in consistent units, and with the helical channel being of a hand such that forward rotation of the shaft and gear means results in the plastic which enters the clearance between said shaft cylindrical bore to be effectively pumped back toward the interior of the housing, and including the steps of delivering the melted plastic to said inlet port means under pressure of at least about 600 psi, and
   rotating said gear means at said rotational speed and in a direction such as to forwardly convey the plastic, and including pumping substantially all of the plastic which enters the clearance between said shaft cylindrical surface portion and said cylindrical bore back toward the interior of said housing.

2. A plastic extrusion apparatus characterized by the ability to extrude a highly viscous plastic material under high pressure and temperature conditions, and without substantial leakage of the material, and comprising
   an extruder adapted for heating and melting a highly viscous plastic and conveying the melted plastic through a discharge port under a pressure of at least about 600 psi,
   a die adapted for receiving hot melted plastic and forming the same into a desired cross-sectional configuration, and
   a gear pump operatively mounted between said discharge port of said extruder and said die for receiving pressurized melted plastic from said discharge port and metering the same through said die, said gear pump comprising
   an enclosed housing having inlet port means for receiving the melted plastic from the discharge port of the extruder, and discharge port means for discharging the plastic to the die,
   gear means rotatably mounted within said housing and adapted upon forward rotation to convey the plastic from said inlet port means to said discharge port means,
   a shaft extending through said housing and operatively connected to said gear means for transmitting rotational torque to the same, said shaft including a cylindrical outer surface portion, and
   means for sealing said shaft to said housing to effectively preclude leakage of the melted plastic therebetween, said sealing means comprising a sleeve removably secured to said housing and having an internal cylindrical bore closely surrounding said cylindrical surface portion of said shaft, with said cylindrical bore having a shallow helical channel formed therein and extending along at least a substantial portion of the axial length thereof, said channel being of generally rectangular cross-sectional configuration and having a depth not exceeding the square root of $6(\text{pi})DNuL/P \tan Q$ wherein D is the diameter of said shaft, N is the revolutions of the shaft per second, u is the viscosity of the plastic, L is the length of the seal, P is the pressure of the plastic, and Q is the lead angle of the helical channel, with such variables being in consistent units, and with the helical channel being of a hand such that forward rotation of the shaft and gear means results in the plastic which enters the clearance between said shaft cylindrical surface portion and said cylindrical bore to be effectively pumped back toward the interior of the housing.

3. The apparatus as defined in claim 2 wherein said channel has a depth not greater than about 0.3 times its width.

4. A gear pump adapted for accurately metering or pressurizing a highly viscous material, such as melted plastic, and characterized by the absence of leakage of the viscous material therefrom, and comprising
   an enclosed housing having inlet port means for receiving the viscous material from the discharge port of an extruder or the like, and discharge port means for discharging the viscous material therefrom,
   gear means rotatably mounted within said housing and adapted upon forward rotation to convey the viscous material from said inlet port means to said discharge port means,
   a shaft extending through said housing and operatively connected to said gear means for transmitting rotational torque to the same, said shaft including a cylindrical outer surface portion, and means for sealing said shaft to said housing to effectively preclude leakage of the viscous material therebetween, said sealing means comprising a sleeve removably secured to said housing and having an internal cylindrical bore closely surrounding said cylindrical surface portion of said shaft, said cylindrical bore having a shallow helical channel of generally rectangular cross-sectional configuration formed in substantially the entire axial length thereof, said channel having a depth not exceeding the square root of 6(pi)DNuL/P tan Q wherein D is the diameter of said shaft, N is the revolutions of the shaft per second, u is the viscosity of the viscous material, L is the length of the seal, P is the pressure of the viscous material, and Q is the lead angle of the helical channel, with such variables being in consistent units, said channel further being of a hand whereby rotation of the shaft in a direction to forwardly rotate the gear means results in the viscous material which enters the clearance between said shaft surface portion and said cylindrical bore to be effectively pumped back toward the interior of the housing.

5. The gear pump as defined in claim 4 wherein the depth of said channel does not exceed about 0.3 times its width.

6. A method for accurately metering a melted plastic material while substantially preventing leakage, and wherein the plastic is metered while passing through a gear pump which comprises
    (a) an enclosed housing having inlet port means for receiving the melted plastic, and discharge port means for discharging the plastic therefrom,
    (b) gear means rotatably mounted within said housing and adapted upon forward rotation to convey the plastic from said inlet port means to said discharge port means,
    (c) a shaft extending through said housing and operatively connected to said gear means for transmitting rotational torque to the same, said shaft including a cylindrical outer surface portion, and
    (d) means for sealing said shaft to said housing to effectively preclude leakage of the melted plastic therebetween, said sealing means comprising a sleeve removably secured to said housing and having an internal cylindrical bore closely surrounding said cylindrical surface portion of said shaft, with said cylindrical bore having a shallow helical channel formed therein and extending along at least a substantial portion of the axial length thereof, said channel being of generally rectangular cross-sectional configuration and having a depth not exceeding the square root of 6(pi)DNuL/P tan Q wherein D is the diameter of said shaft, N is the rotational speed of the shaft in revolutions per second, u is the viscosity of the plastic, L is the length of the seal, P is the pressure of the plastic, and Q is the lead angle of the helical channel, with such variables being in consistent units, and with the helical channel being of a hand such that forward rotation of the shaft and gear means results in the plastic which enters the clearance between said shaft cylindrical bore to be effectively pumped back toward the interior of the housing, and comprising the steps of delivering melted plastic to said inlet port means under pressure of at least about 600 psi, rotating said gear means at said rotational speed and in a direction such as to forwardly convey the plastic, and including pumping substantially all of the plastic which enters the clearance between said shaft cylindrical surface portion and said cylindrical bore back toward the interior of said housing.

7. The method as defined in claim 6 wherein the melted plastic delivered to said inlet port means has a viscosity of at least about 500,000 centipoise.

8. The method as defined in claim 7 wherein the rotating of said gear means produces a pressure of at least about 4,000 psi at the discharge port means.

* * * * *

UNITED STATES PATENT AND TRADEMARK OFFICE
CERTIFICATE OF CORRECTION

PATENT NO. : 4,336,213
DATED : June 22, 1982
INVENTOR(S) : Steve A. Fox

It is certified that error appears in the above-identified patent and that said Letters Patent are hereby corrected as shown below:

Column 4, line 6, "are" should be --as--;

Column 4, line 38, "0.0074" should be --0.074--.

Signed and Sealed this

Second Day of November 1982

[SEAL]

Attest:

Attesting Officer

GERALD J. MOSSINGHOFF

Commissioner of Patents and Trademarks